US010609362B2

(12) United States Patent
Meacham (10) Patent No.: US 10,609,362 B2
(45) Date of Patent: Mar. 31, 2020

(54) PROJECTED HOGEL AUTOSTEREOSCOPIC DISPLAY

(71) Applicant: G. B. Kirby Meacham, Shaker Heights, OH (US)

(72) Inventor: G. B. Kirby Meacham, Shaker Heights, OH (US)

(*) Notice: Subject to any disclaimer, the term of this patent is extended or adjusted under 35 U.S.C. 154(b) by 170 days.

(21) Appl. No.: 15/530,831

(22) PCT Filed: Oct. 1, 2015

(86) PCT No.: PCT/US2015/053533
§ 371 (c)(1),
(2) Date: Mar. 7, 2017

(87) PCT Pub. No.: WO2016/057308
PCT Pub. Date: Apr. 14, 2016

(65) Prior Publication Data
US 2018/0309981 A1   Oct. 25, 2018

Related U.S. Application Data
(60) Provisional application No. 62/061,827, filed on Oct. 9, 2014.

(51) Int. Cl.
*H04N 13/32* (2018.01)
*G02B 30/27* (2020.01)
*G02B 30/26* (2020.01)
*H04N 13/351* (2018.01)
*H04N 13/305* (2018.01)
(Continued)

(52) U.S. Cl.
CPC .......... *H04N 13/32* (2018.05); *G02B 27/0972* (2013.01); *G02B 30/26* (2020.01); *G02B 30/27* (2020.01); *H04N 13/305* (2018.05); *H04N 13/346* (2018.05); *H04N 13/351* (2018.05); *H04N 13/363* (2018.05); *H04N 9/317* (2013.01); *H04N 9/3147* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,411,489 A | * | 10/1983 | McGrew | G03H 1/0406 359/23 |
| 6,369,949 B1 | * | 4/2002 | Conley | G02B 30/27 359/619 |

(Continued)

*Primary Examiner* — Alexander Gee (57) ABSTRACT

The present invention is an improvement in dynamic autostereoscopic visual displays emitting a field of light beams into an observer viewing space from a hogel array formed at a transparent projection screen surface having refractive beam expanding functions. The transparent screen is illuminated from the rear by an X-Y array of projectors focused on the screen, where each hogel location is illuminated by a local group of multiple projectors within the larger array. The brightness, color and direction of the light beams emitted by each hogel are controlled by one image point in each member of the local projector group that illuminates that hogel. The invention enables autostereoscopic display systems with compact dimensions and high overall resolution and brightness by combining the output of an array of small projectors with lower resolution and brightness on a single projection screen.

5 Claims, 8 Drawing Sheets

(51) Int. Cl.
*G02B 27/09* (2006.01)
*H04N 13/363* (2018.01)
*H04N 13/346* (2018.01)
*H04N 9/31* (2006.01)

(56) References Cited

U.S. PATENT DOCUMENTS

| | | | |
|---|---|---|---|
| 2005/0275942 A1* | 12/2005 | Hartkop | H04N 13/31 |
| | | | 359/464 |
| 2006/0109569 A1* | 5/2006 | Ogawa | G02B 3/08 |
| | | | 359/742 |
| 2009/0059103 A1* | 3/2009 | Azor | G02F 1/1347 |
| | | | 349/8 |
| 2011/0063289 A1* | 3/2011 | Gantz | G03H 1/02 |
| | | | 345/419 |
| 2014/0125957 A1* | 5/2014 | Lee | H04N 13/363 |
| | | | 353/37 |
| 2014/0198364 A1* | 7/2014 | Son | G02B 30/27 |
| | | | 359/23 |
| 2015/0260897 A1* | 9/2015 | He | G02B 6/0016 |
| | | | 362/612 |

* cited by examiner

PROJECTED HOGEL AUTOSTEREOSCOPIC DISPLAY

FIELD OF THE INVENTION

The present invention is related to dynamic hologram-like visual displays comprising an array of image points on a screen wherein the brightness and color of the field of light rays from each image point vary as a function of viewing angle, thereby forming an array of holographic pixels or hogels adapted to displaying autostereoscopic images. More particularly, it is related to dynamic visual displays systems comprising an array of multiple image projectors and a single rear projection screen to produce a hogel array of larger extent than the field of each individual projector in the projector array, enabling autostereoscopic display systems with compact dimensions and high overall resolution and brightness.

BACKGROUND OF THE INVENTION

Stereoscopic display of visual scenes requires that a separate two-dimensional image of a scene be supplied to each eye of the observer, wherein each image is a member of a stereo pair that depicts the scene from a different perspective viewpoint. The observer's visual system fuses the images, providing a realistic three dimensional impression. A number of known systems require the observer to wear glasses, goggles or similar devices to supply separate images to each eye. For many applications, however, such devices are inconvenient or impractical.

Autostereoscopic three dimensional displays direct separate two-dimensional images of a scene to each eye of the observer without requiring the observer to wear any device. An optical system superimposes the two-dimensional images on a viewing plane or screen, while directing the light from each image such that each eye of an observer perceives a different two dimensional image. If the two images are stereoscopically related perspective views of the scene, the observer will perceive a realistic three dimensional impression of the scene. This approach works with as few as two views, but in this case the observer must seek out the position where each eye perceives the correct image. A preferred embodiment employs more than two stereoscopically related scene images directed such that there is an array of viewing positions wherein the observer perceives a stereoscopic image pair. Further, when the observer moves side-to-side within the array of positions, his eyes will transition from image to image and he will experience a life-like change in the scene perspective. A wide array of viewing positions also allows multiple observers to view the same scene. Alternatively, each observer may be shown a different scene in applications such as video games. In all cases the systems are very intuitive to use: the observers simply approach the screen and perceive a 3-D image when they are in position to look through the array of viewing positions.

Such multiple view autostereoscopic displays typically comprise a planar array of holographic pixels or "hogels" on a screen wherein each hogel emits two or more directed light beams, wherein the brightness and color of each light beam may be dynamically varied by an image control system. An observer's eye positioned within a given light beam perceives that hogel as a pixel with the color and brightness unique to that beam, and does not perceive the beams emitted in other directions. Other hogels in the planar array emit light beams that are also directed at the observer's eye such that in aggregate the observer perceives an array of pixels that form a two dimensional image. At a different position the observer's eye is within a different set of light beams and perceives an array of pixels forming a different two dimensional image on the same hogel plane. The hogel array therefore provides apparatus capable of displaying dynamic two dimensional images that change with the observer's eye position, and in combination with an image control system may be used for autostereoscopic display and other visual effects. Several prior art means of forming a hogel array are known, and each has its advantages and drawbacks.

Spatially multiplexed flat panel dynamic autostereoscopic displays based on an angularly selective lenticular screen overlaid on a liquid crystal pixel array display are a commercially available implementation of the hogel principle. Multiple pixels under each lenticel each project light beams toward the observer in a different direction, providing the required variation of content with the observer's eye position. They have the disadvantage of dividing the resolution of the underlying liquid crystal display among the multiple two dimensional views, with the result that the perceived resolution is significantly lower than for comparable two dimensional displays. Time multiplexed flat panel dynamic autostereoscopic displays based on an angularly variable backlight illuminating a liquid crystal pixel array have been proposed. In these systems a sequence of two dimensional images is displayed within each video frame time interval, each image backlit from a different angle, to form multiple directed light beams in each hogel. The observer's persistence of vision provides the perception of a continuous image at each eye position. While full resolution of the liquid crystal display is preserved, the required display switching speed is increased by a factor equal to the number of light beam directions and the time average illumination and perceived brightness of each two dimensional image are decreased.

Multiple projector autostereoscopic displays where a separate projector is used for each set of hogel light beams provide full resolution and brightness at a normal frame rate switching speed are known in the prior art, and promise high quality image display without the compromises of spatially or time multiplexed displays. They typically focus the multiple projectors on a common screen such that each projector provides light from a different angle for each point on the screen to form the hogel array, and utilize controlled amounts of Gaussian diffusion in the screen to expand the projector light beams to avoid dark zones in the images or viewing zones. By its nature, however, Gaussian diffusion results in non-uniform illumination and causes overlap and double imaging between adjacent virtual apertures. WO 2014/070641 by this inventor describes novel projection screens for multiple projector autostereoscopic displays, and is incorporated by reference in its entirety. In particular, screens according to WO 2014/070641 utilize refractive optics rather than Gaussian diffusion to expand the projector light beams, largely eliminating non-uniform illumination and overlap and double imaging. Prior art projected displays of all types, however, require a significant amount of physical volume that increases with screen size in front of the screen for front projection or behind the screen for rear projection to accommodate the projector light paths, limiting application flexibility compared to flat panel displays.

The autostereoscopic displays discussed thus far have hogels that provide horizontal perspective variation only (X-only), resulting in lack of perspective change with vertical changes in the observer's position that can appear unnatural. Adding vertical perspective variation (X-Y) has been proposed in the literature, but is primarily confined to hologram-like non-dynamic images in practice since it greatly increases the system performance requirements to display the additional perspective views. Spatially multiplexed and time multiplexed X-Y displays face increased image quality compromises, and multiple projector X-Y displays require a large increase in the number of projectors that in the past would have been difficult in practice because of physical projector size and cost. The situation is changing. Multiple projector displays, including X-Y displays are becoming an increasingly practical proposition, driven by current and anticipated future reductions in the size, cost and energy consumption of commercially available video projectors. Such projectors include picoprojectors small enough and low enough in cost to be integrated into cellular telephones, exemplified by a projector described in US 2010/0066921 by El-Ghoroury et al. assigned to Ostendo Technologies, Inc. The Ostendo projectors, shown in FIG. 13 of US 2010/0066921, comprise a multicolor laser array image source, drive circuitry, and projection lens in a small module that requires no additional optical elements or illumination sources. Further, the image source is fabricated on a silicon wafer providing potentially low cost production as well as the stable image geometry desirable in applications in which multiple projectors are combined such that each contributes a portion of an overall image. US 2010/0066921 is incorporated in its entirety by reference.

Display image resolution expectations of users are also increasing. Commercially available two dimensional high end flat panel and projected displays offer 4000 lines, establishing a significant performance target for X-only and X-Y autostereoscopic displays. Such resolution, however, is out of reach using current picoprojectors in conventional configurations wherein each projector illuminates the full screen area.

A need clearly exists for multiple projector autostereoscopic systems based on small, low resolution projectors that provide high resolution images having both horizontal and vertical perspective variation and having relatively small physical volume.

SUMMARY OF THE INVENTION

The present invention is an improvement in dynamic autostereoscopic visual displays emitting a field of light beams into an observer viewing space from a hogel array formed at a transparent rear projection screen surface. The transparent screen is illuminated from the rear by an array of projectors focused on the screen, where each hogel location is illuminated by a local group of multiple projectors within the larger array. The brightness, color and direction of the light beams emitted by each hogel are each controlled by one image point in each member of the local projector group that illuminates that hogel. Specifically, the direction of a particular emitted light beam is determined by the X-Y angle of a sight line connecting the optical center of the corresponding projector lens and the hogel location on the screen. The color and brightness of this emitted light beam are determined by the color and brightness of the light projected along this sight line. The multiple projectors illuminating each hogel location each have a unique sight line to the hogel, such that each projector results in a light beam emission into the observer viewing space from the hogel in a unique direction and with color and brightness controlled by that projector. In combination the projectors in the local group form a hogel that varies in color and brightness as a function of the observer's viewing position, the basic functionality required for hologram-like autostereoscopic display. Preferably the angle separating the centerlines of any two adjacent hogel light beams is small enough that each of an observer's eyes sees a different beam from the hogel at a typical viewing distance. This angle is set by the projector spacing in the display array and the distance between the projectors and the transparent projection screen.

A projector light beam leaves the projector lens with cross section size and shape defined by the projector lens exit pupil, converges to a focal point at the transparent projector screen, and passes into the observer viewing space where it diverges while maintaining the same direction and cross sectional shape. Dark zones exist between light beams from adjacent projectors illuminating the same hogel since the projector exit pupils are typically smaller than the projector spacing. Without the transparent projection screen these dark zones also exist between diverging light beams in the observer viewing space, and result in dark areas between eye positions where the hogel is visible. The transparent projection screen is a type described in WO 2014/070641 by this inventor, and has the property of uniformly spreading the projector light beams passing through using optical refraction, with sharp cutoff at the edges. In a preferred embodiment the projector lenses incorporate square aperture stops such that the exit pupils and the light beams have square cross sections that allow expanded adjacent light beams in the observer viewing space to join without dark zones or overlap and crosstalk between the beams. Screens according to WO 2014/070641 optionally include Fresnel lens functions to change the direction of the light beams in the observer viewing space to modify the size and shape of the viewing zone.

A single hogel is formed at the transparent screen by illumination from a single image point in each projector in the local projector group, and every other image point in each projector in the projector may contribute to a hogel at a different screen location. This property allows an X-Y projector array to form a closely spaced array of hogels that together form images visible in the observer viewing space, where the content of the images changes with the observer's eye position.

Autostereoscopic display is a primary application in which the observer's interocular separation causes each eye to perceive a different and appropriate perspective view of a single scene that gives a stereoscopic impression. Other applications include scientific, artistic, informational or novelty effects where the view perceived changes with eye position: e.g. perceiving different interior layers of a subject by simply shifting viewpoint.

In a preferred embodiment each projector in the array is a digital video projector in which the color and brightness of each projected image point is independently controlled at the video frame rate, allowing dynamic variation of the light beams emitted by each hogel. A variety of known means may be used to determine the color and brightness of each projected image point in each projector to achieve a desired effect. The transparent projection screen that expands the solid angle from the light beams emerging from each hogel to eliminate dark zones between light beams and provide continuous viewing with changes in the observer's eye position is based on refractive optics. In a first alternative described in WO 2013/070641, one surface of the screen comprises a vertical array of small parallel negative focus cylindrical lenses, and the opposite surface comprises a horizontal array of array of small parallel negative focus cylindrical lenses. Preferably the cylindrical lens spacing is smaller than the projected pixel spacing. Refraction expands the beams with uniform brightness and sharp cutoff at the beam edges, but does not change the beam direction. This reduces the non-uniform brightness and double imaging at the beam edges typical of prior art Gaussian diffusers used to expand viewing angles. The required expansion depends on the projector separation, exit pupil dimensions and distance to the screen, and is a function of the screen index of refraction, cylindrical lens radius and cylindrical lens width. In a second alternative, according to the teaching of WO 2013/070641, each negative focus cylindrical lens may be formed on the face of a Fresnel-like linear prism such that the rays passing through have both angular expansion and a change in direction. This directional change allows horizontal and vertical cylindrical field lens functions to be incorporated into the transparent screen that may be used to modify the screen field of view.

Preferred embodiments of the display apparatus of this invention take advantage of recent and anticipated future developments in picoprojectors. Individually, picoprojectors have relatively low brightness and resolution over a relatively limited screen area, but when combined in an array can in aggregate provide high resolution and brightness over a large area in a small physical package. The projector distance behind the screen is set to provide the required screen resolution, and the projector spacing is set to provide the required angular separation between the centerlines of any two adjacent hogel beams. Since lower projector resolution results in reduced distance behind the screen, the overall physical depth of the display apparatus is reduced compared to systems with a smaller number of higher resolution projectors having the same screen resolution and hogel beam angular separation. The system is modular in that the display area may be changed by increasing or decreasing number of projectors in the array while retaining the same projector parameters and spacing. Significantly, unlike conventional rear projection displays, the physical depth of the display is substantially independent of the display area.

BRIEF DESCRIPTION OF THE DRAWINGS

In the drawings, in which like reference numbers indicate corresponding parts throughout the several views.

DETAILED DESCRIPTION OF THE PREFERRED EMBODIMENTS

In the following description and claims it is understood that the terms "cylindrical" and "plane or planar" are used in a general, not a strict sense. "Cylindrical" lenses, for example, may incorporate known aspheric design features to reduce aberrations. Similarly, "planar" surfaces may have curvature to meet specific image display objectives. Further, projectors with planar image forming surfaces and projection lenses are used to illustrate the optical principles of the invention, and other projector types such as scanning laser projectors are applicable. Projectors incorporating deliberate distortions or that focus on non-planar surfaces or that have manual or automatic means to correct alignment or distortion optically or in software are also applicable. The fundamental capability of a display system according to this invention to form dynamic images that change in appearance with eye position in a controlled manner be used to achieve a variety of visual effects either related to autostereoscopic display or for other artistic, informational or novelty purposes.

Figure 1:
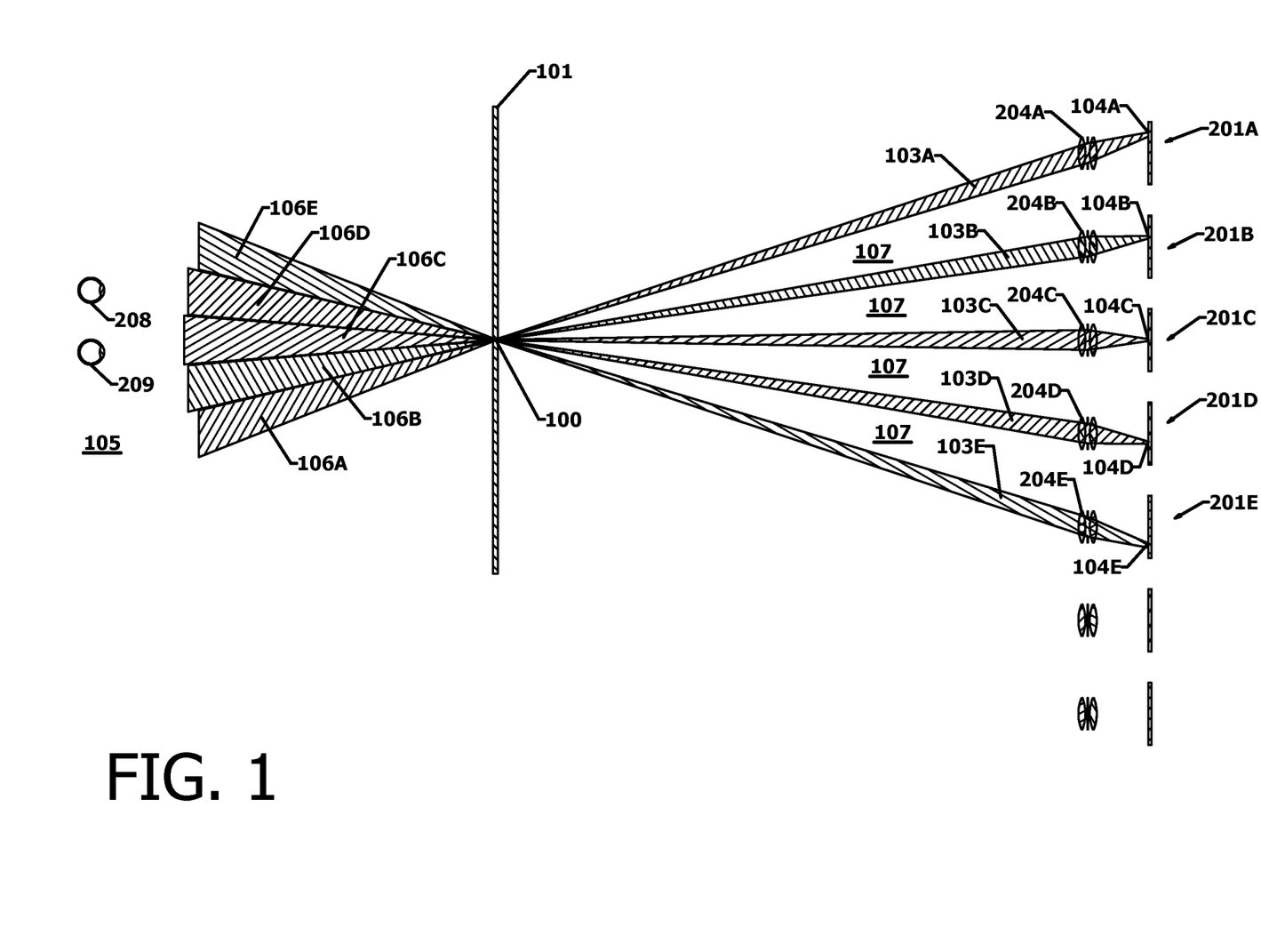
FIG. 1 is a sectional view illustrating the formation of a single hogel on the projection screen.
Figure 2:
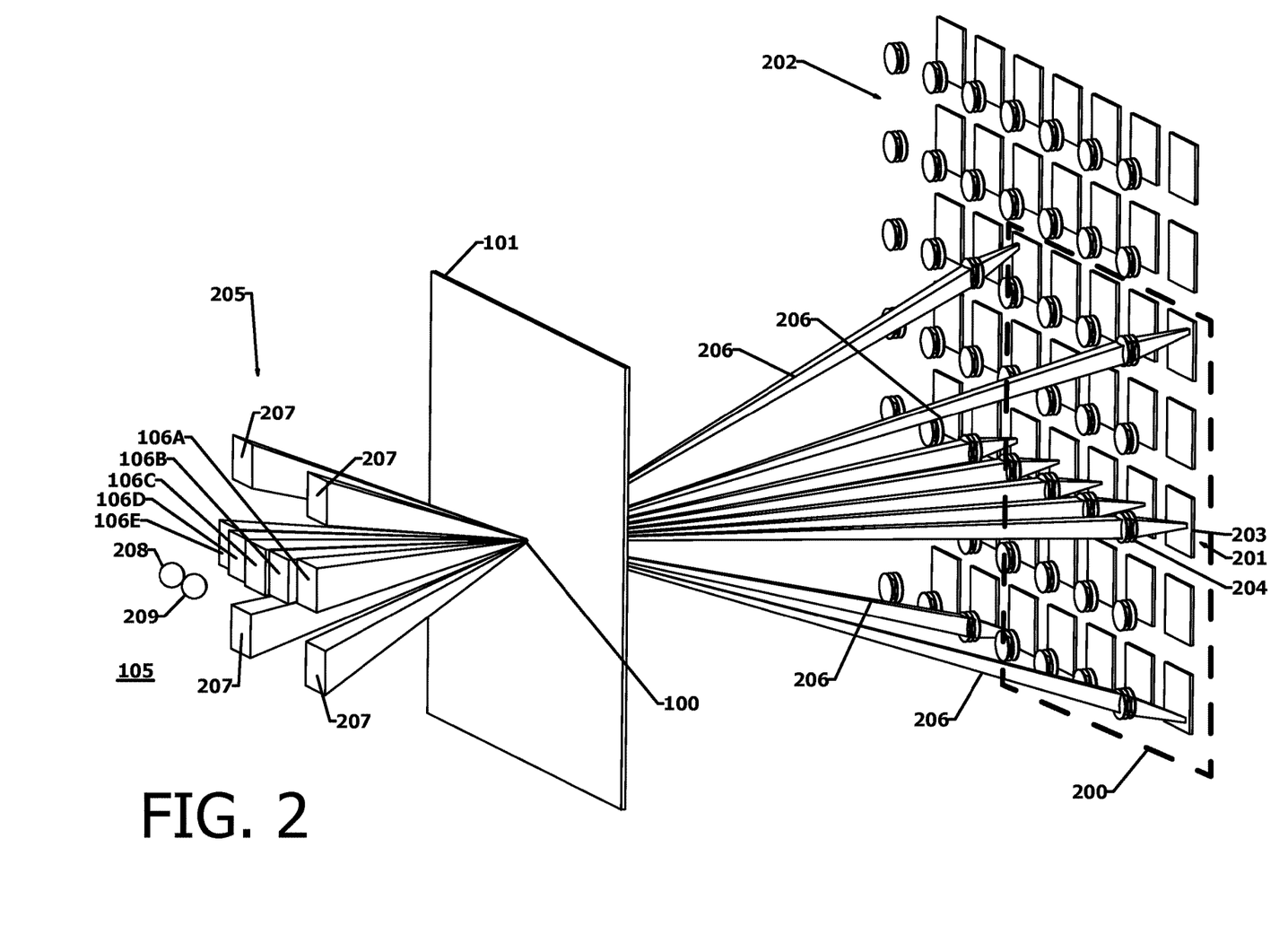
FIG. 2 is a perspective view illustrating the formation of a single hogel on the projection screen.
Figure 3:
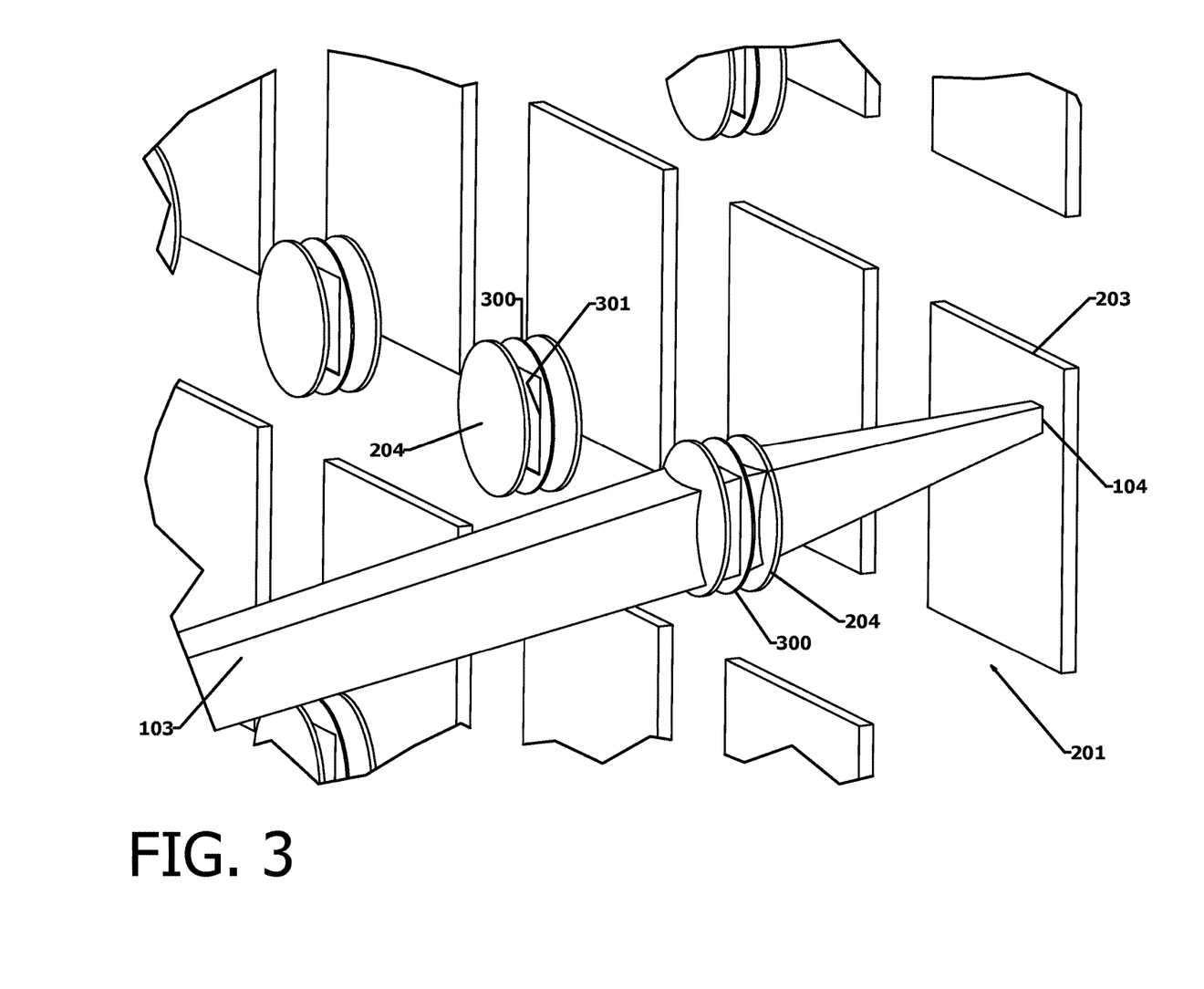
FIG. 3 is a detail showing the arrangement of projectors and aperture stops.

FIG. 1 and FIG. 2 illustrate the formation of a holographic pixel or hogel 100 at the transparent projection screen 101. The hogel is not a physical object. Rather, it is a small area of the screen that is illuminated by the superimposed real images from a two dimensional local matrix 200 of projectors 201 in the larger projector matrix 202. The projectors 201 comprise illuminated pixel planes 203 and lenses 204 that project focused images of the pixel plane s 203 onto the projection screen 101. A single row of the projectors in the local matrix 200, designated 201A through 201E, is shown in FIG. 1. Tapered light beams 103A through 103E each originate at spots 104A through 104E on the illuminated image planes 203 A through 203E, diverge to the projector lenses 204A through 204E, and converge to a focus at the hogel 100 and pass through the transparent screen 101 into the observer space 105. In the observer space 105 the light forms become diverging tapered light beams 106A through 106E. As shown in FIG. 3, lens aperture stops 300 in projector lenses 204 preferably incorporate substantially square apertures 301 such that converging tapered light beams 103 have square cross sections and have a taper angle that is a function of the projector focal length and aperture dimensions. Tapered dark spaces 107 separate converging tapered light beams 103A through 103E between the lenses 204 and the transparent screen 101. Transparent screen 101, which is described in more detail in reference to FIG. 4 and FIG. 5, has the function of expanding each diverging tapered light beams 106A through 106E such that the tapered dark spaces 107 between the lenses 204 and the transparent screen 101 are substantially eliminated in the observer viewing space 105. Diverging tapered light beams 106A through 106E shown in FIG. 1, together with additional converging light beams 206 and diverging light beams 207 shown in FIG. 2 from the other members of local matrix 200 of projectors 201 situated above and below 106A through 106E, all converge on the hogel 100. Together the beams 106 and 207 define a continuous volume 205 in observer viewing space 105 wherein hogel 100 is visible to an observer's eye 208. The extent of the full set of light beams 106 and 207 is indicated by the extreme corner beams 207, and Intermediate beams are omitted for clarity. The perceived color and brightness of hogel 100 therefore depends on both the vertical and horizontal viewing angles along a sightline from the hogel to the eye 208.

Consider for example the color and brightness of the image spot formed by hogel 100 perceived by an eye 208 in the observer viewing space 105 positioned within diverging tapered light beam 106D as shown in FIG. 1. This color and brightness are determined by the color and brightness of image spot 104D in projector 201D. A second eye 209 positioned within diverging tapered light beam 106C perceives hogel 100 as having color and brightness determined by the color and brightness of image spot 104C in projector 201C. An eye positioned anywhere within a given diverging tapered light beam perceives the same hogel 100 color and brightness, and perceives a different hogel 100 color and brightness if it shifts into an adjoining diverging tapered light beam. This discontinuous change in the color and brightness of hogel 100 with eye position shifts differs from the continuous change experienced with position shifts while viewing an original scene, and is a result of the approximation involved in using a finite number of projectors to form the hogels. Larger numbers of more closely spaced projectors improve the approximation, but require higher attendant data processing and transmission rates.

A single hogel 100 is formed at the transparent projection screen 101 by illumination from a single image spot 104 in each projector 201 in the local projector matrix 200, and every other image spot 104 in each projector 201 may contribute to a hogel at a different screen location. This property allows an X-Y projector array 202 to form aclosely spaced array of hogels 100 that together form images visible in the observer viewing space 105, where the content of the images changes with the observer's eye position. Such a hogel array comprising digital projectors is capable of varying display characteristics including apparent image three dimensional depth under software control without hardware adjustments. The primary hardware requirement for presenting autostereoscopic images is to design the projector array 202 and projectors 201 such that the angular separation of adjoining diverging tapered light beams 106A through 106E in each hogel is small enough that each of an observer's eyes 208 and 209 is within a different diverging tapered light beam at the observer's viewing distance.

Figure 4:
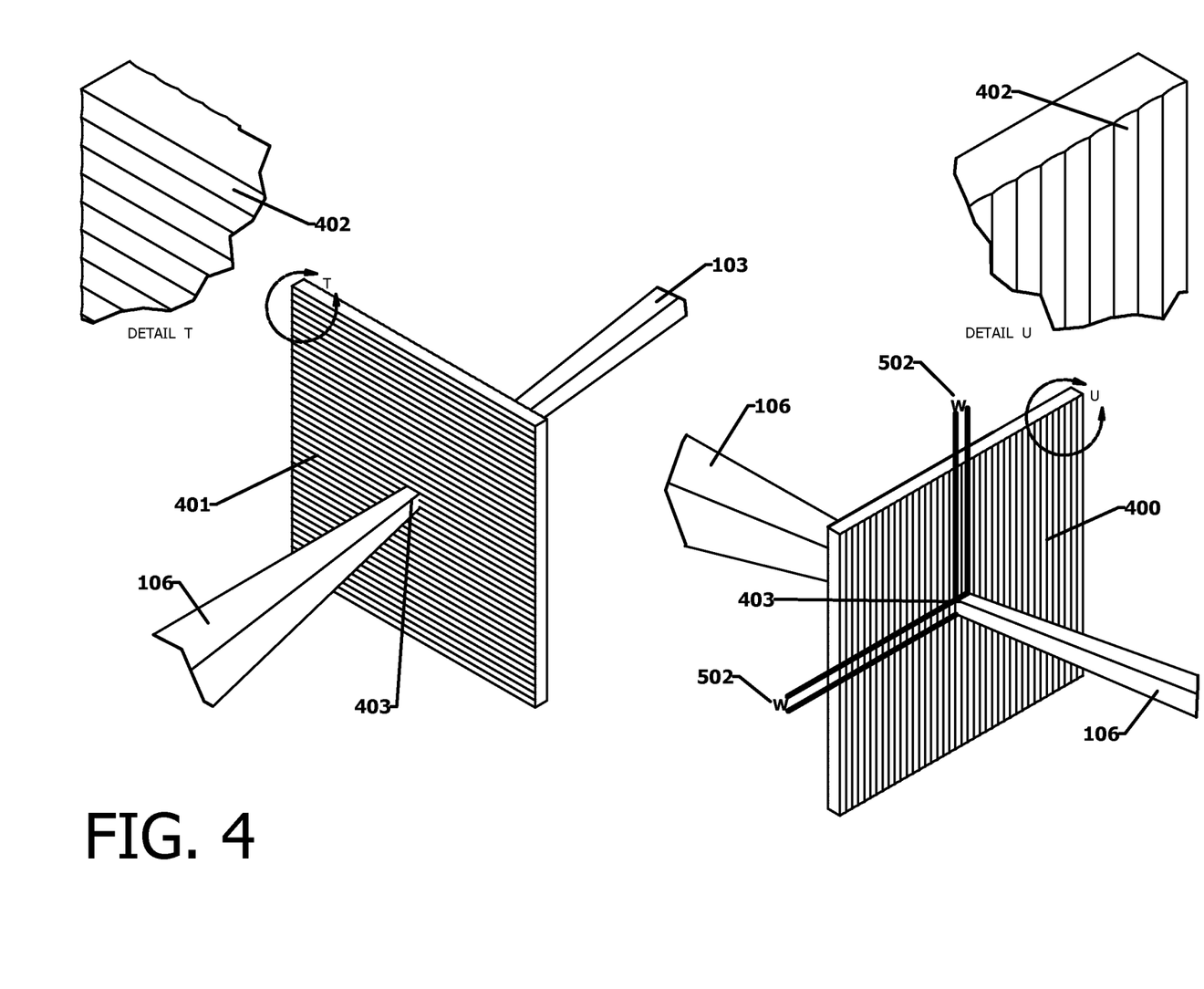
FIG. 4 includes perspective views of the refractive beam expanding projection screen.
Figure 5:
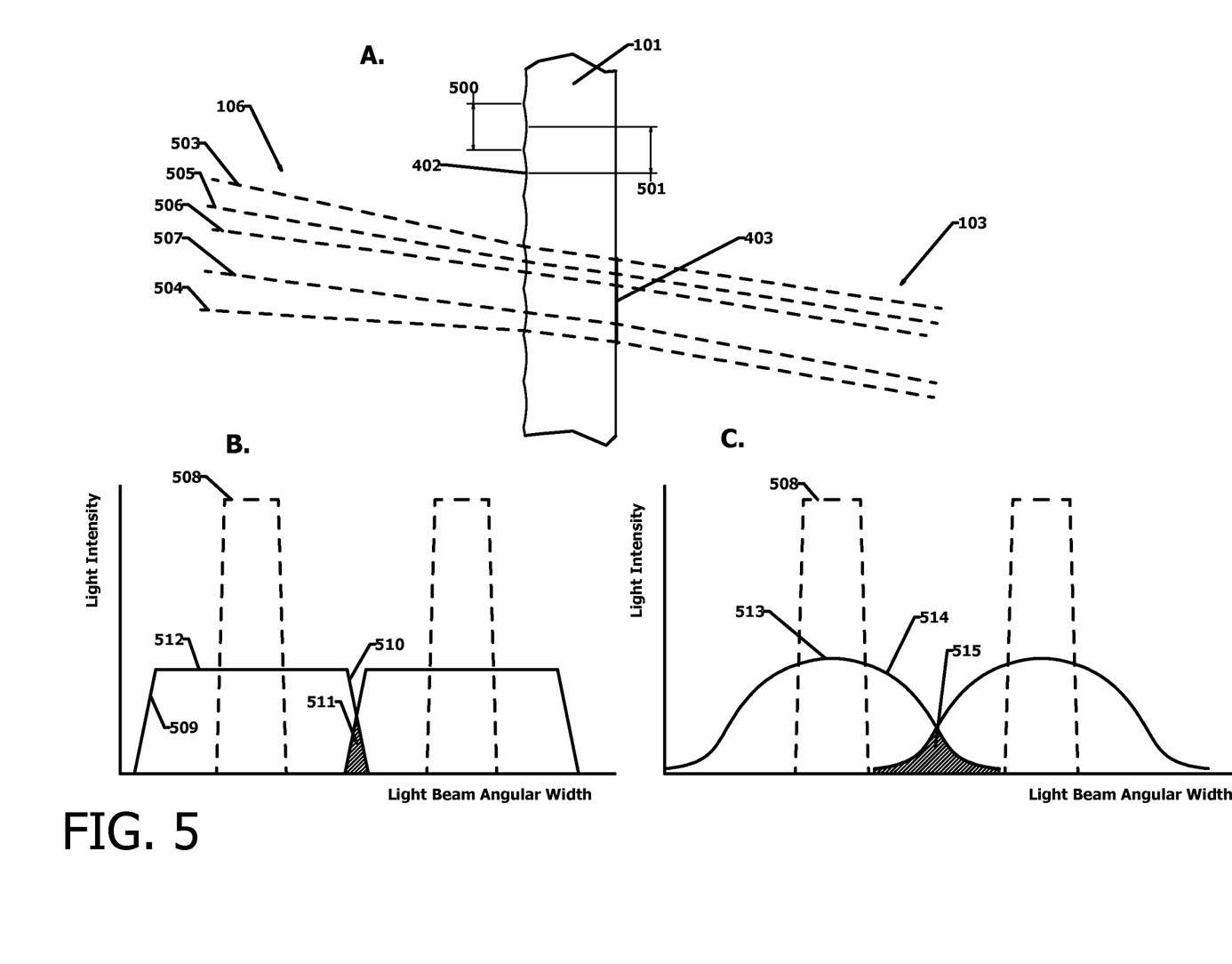
FIG. 5 shows optical details of the refractive beam expanding projection screen.

FIG. 4 and FIG. 5 illustrate details of the transparent screen 101, where FIG. 4 shows front and rear perspective views, FIG. 5A shows the optical details and FIG. 5B and FIG. 5C compare the divergence characteristics of the inventive screen and the conventional Gaussian diffusers. Transparent screen 101 is formed of a vertical linear lenticule array 400 superimposed on a horizontal lenticule array 401. Each lenticule in arrays 400 and 401 has a concave surface 402 that forms a negative short focus cylindrical lens surface with a width dimension 500 substantially equal to the lenticule pitch dimension 501 such that there is a sharp transition between adjacent concave surfaces 402. Incoming light ray beams 103 from projectors 201 converge to a focus at the plane of the transparent screen 101 and form real image spots 403 of the corresponding image spots 104 on illuminated image planes 203 in the projectors. Real image spots 403 have vertical and horizontal dimensions 502 designated as W, and are pixels in the sense that they do not contain image detail and have essentially uniform color and brightness. The negative cylindrical lensing effect of the concave surfaces 402 refracts light rays in converging light ray beams 103 in different directions depending on the position individual rays intersect the concave surfaces 402. Light rays 503 and 504 passing near the edges of a concave surface 402 are refracted a maximum amount in opposite directions increasing their divergence, while rays 505 and 506 intersecting the concave surface closer to the center are refracted progressively smaller amounts. Ray 507 intersecting the center of the concave surface is not refracted. The result is that the light rays of a converging light ray bundle 103 that pass through the concave surfaces 402 in the transparent screen 101 emerge as a diverging light ray beam 106 having increased divergence. The total divergence of the outgoing diverging light ray beam 106 is a function of the convergence of the incoming converging light ray beam 103 and the maximum deflection caused by refraction at the edges of the concave surface 402. The maximum deflection is a design parameter that is a function of the transparent screen 101 index of refraction and concave surface 402 curvature and pitch dimension 501, and provides a sharp upper limit in the divergence angle of the outgoing diverging light ray beam 106.

FIG. 5B shows the light intensity 508 versus angular width of two adjacent incoming light beams 103 and the light intensity 509 versus angular width of the corresponding diverging output beams 106 using the refractive screen of the of the invention. The sharp cutoff 510 in light intensity at the edges of the diverging light ray beams 106 shown results in minimal crosstalk 511 and resultant double imaging, and the peak illumination 512 is uniform. These features distinguish the refractive method of increasing beam divergence from Gaussian diffusion that is shown in FIG. 5C. Gaussian diffusion is characterized by brightness variation 513 within the diverging output beam and gradual cutoff 514 at the edges. The gradual cutoff causes increased crosstalk 515 between adjacent diverging light ray beams 106, increasing double imaging that may be perceived by the observer's eyes.

In a preferred embodiment the dimension 502 of the real image spots 403 is equal to or larger than the lenticule pitch dimension 501. This assures that the light rays forming each real image spot 403 pass through at least the full width of a single concave surface 402 or portions of adjacent concave surfaces 402 totaling at least a full width, and are thereby deflected over the full range of angular values including the maximum deflections in each direction at the edges of the concave surfaces. The light rays in the bundle forming the real image spots 403 are interchangeable since they are the same color and brightness, so that the divergence, color and brightness of the diverging light ray beams 106 are independent of the specific rays that are deflected in each direction. This preferred embodiment eliminates any need to align the real image spots 403 with the concave surfaces 402.

Figure 6:
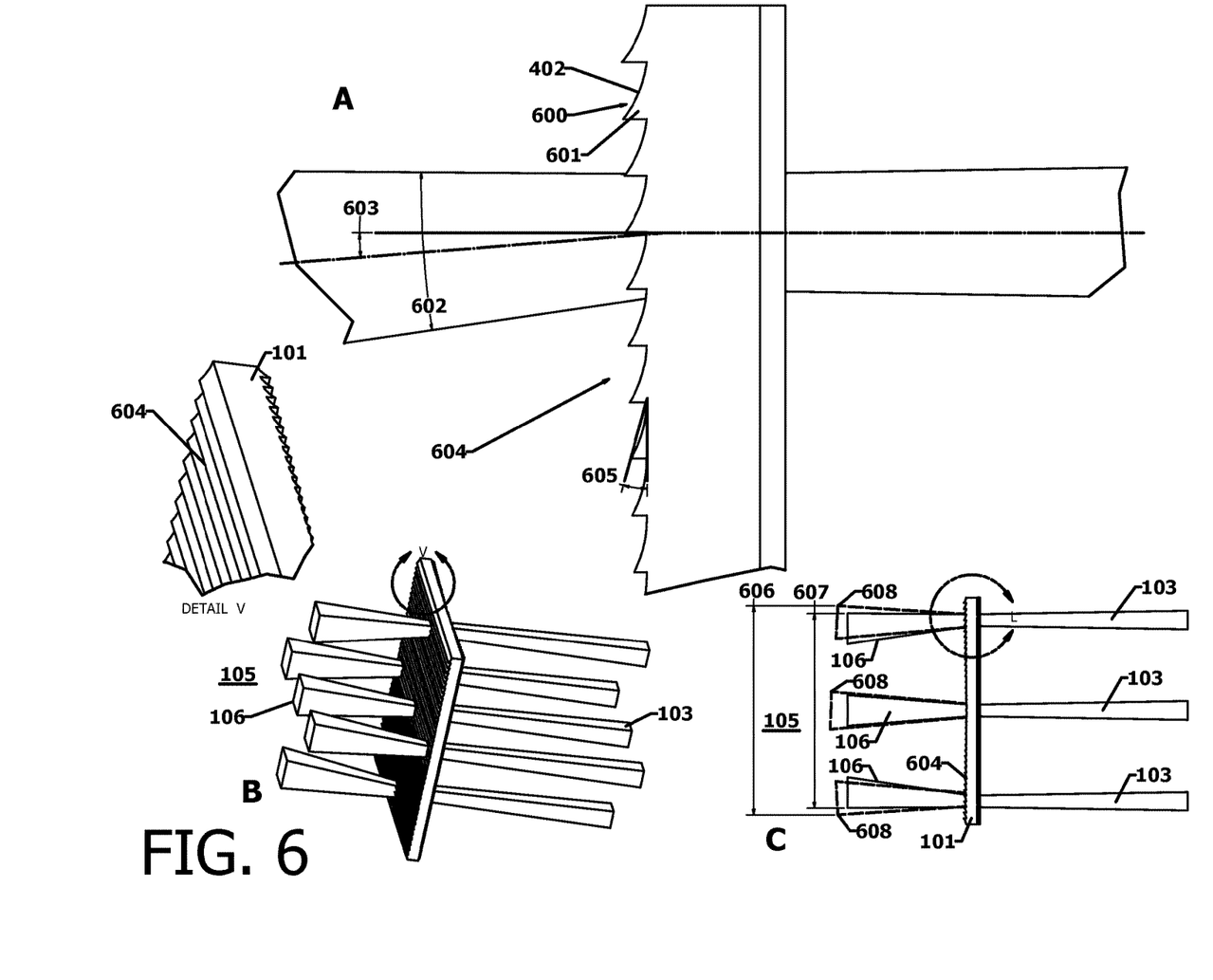
FIG. 6 shows the refractive beam expanding projection screen incorporating Fresnel-like prisms.

In the preferred embodiments discussed above the vertical linear lenticule array 400 increases the horizontal divergence of the light beams passing through the transparent screen 101 without changing the beam direction. Similarly, the horizontal linear lenticule array 401 increases the vertical angular divergence of light beams passing through the screen without changing the beam direction. FIG. 6 shows another preferred embodiment according to the teaching of WO 2013/070641. As shown in FIGS. 6A and 6B the concave surface 402 forming each negative focus cylindrical lens may be formed on the face 600 of a Fresnel-like linear prism 601 such that the rays passing through have both angular expansion 602 and a change in direction 603. Light beams 608 shown by broken lines indicate the beam profiles that would exist without the linear prisms 601. This directional change allows horizontal and vertical cylindrical field lens functions to be incorporated into the transparent screen that may be used to modify the screen field of view as illustrated in FIG. 6C. In this example an array 604 of Fresnel-like linear prisms 601 comprise concave surfaces 402 on the faces 600. The inclination angle 605 of each prism 601 increases monotonically from zero near the center of the transparent screen 101 to a maximum at the edge of the screen, providing the function of a positive focal length cylindrical field lens superimposed on the screen. This has the effect of compressing the width 606 of the observer viewing space 105 that would be obtained without the prism array 604 to a narrower width 607. The angular width of adjoining diverging tapered light beams 106 is also compressed, decreasing their angular separation and thereby decreasing the effective spacing of the projectors 201 in the projector array 202. This compression has two principal effects. First, it directs the light beams near the edge of the screen in toward the center of the observer's viewing area, thereby increasing the visibility of the screen edges within the reduced viewing width 607. Second, it is possible to increase the physical spacing of the projectors 201 in the projector array 202, thereby reducing the number of projectors required while retaining the angular width of the diverging tapered light beams. The reduced observer viewing space width 607 is acceptable or even advantageous in some applications. The compression may be applied in the horizontal direction, the vertical direction, or both, and need not be the same in both directions. In a similar way prisms, 601 may be configured to form negative focus field lenses that expand the viewing zone in either or both directions, at the expense of requiring reduced physical spacing of the projectors 201 in the projector array 202 and a larger number of projectors for a given level of performance. It should be noted that the compression or expansion affects the image viewing zone size, not the image size.

Figure 7:
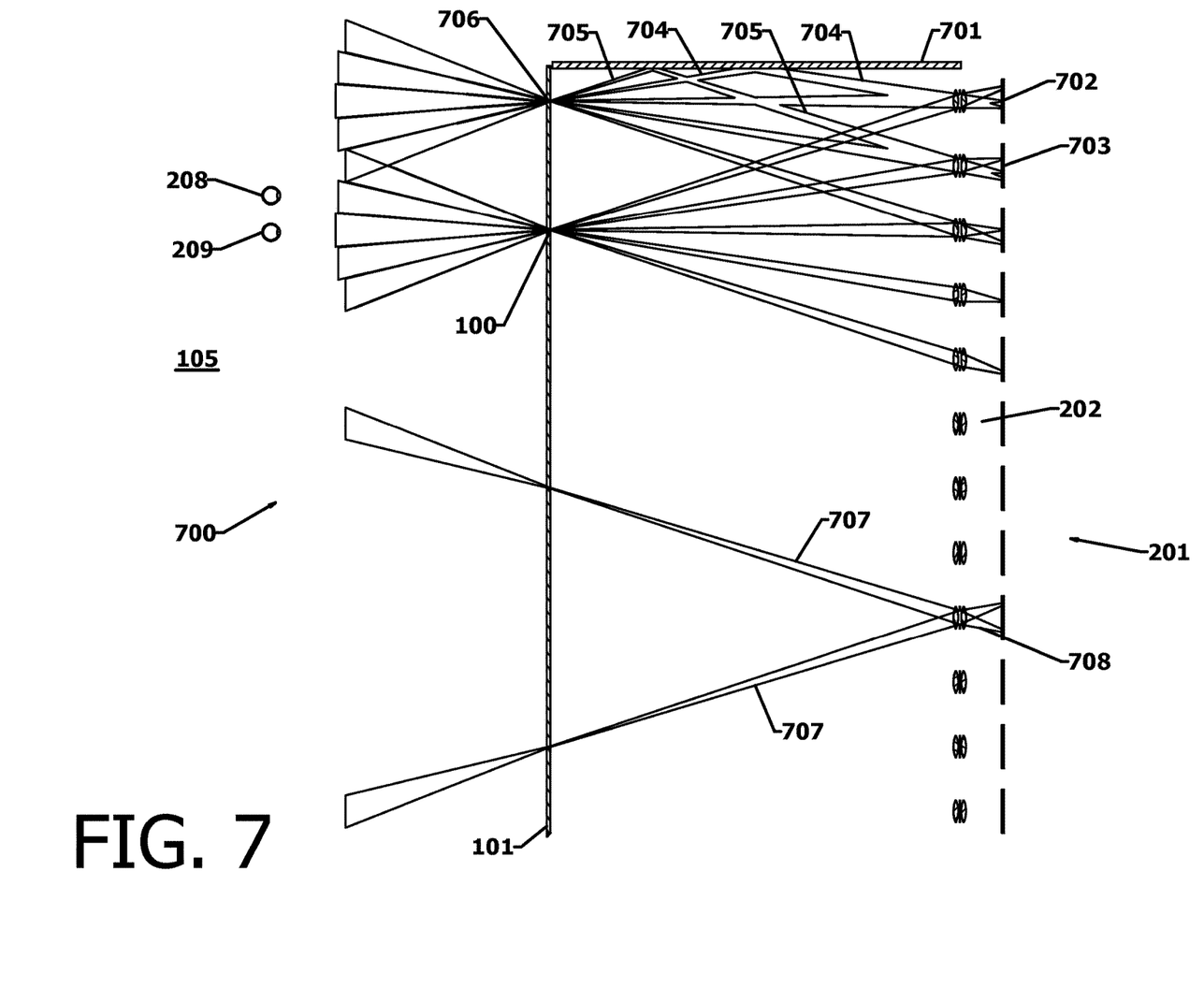
FIG. 7 is a sectional view illustrating an embodiment of the invention comprising a total image extent larger than the image of a single projector and us of mirrors to illuminate hogels near the display edge.
Figure 8:
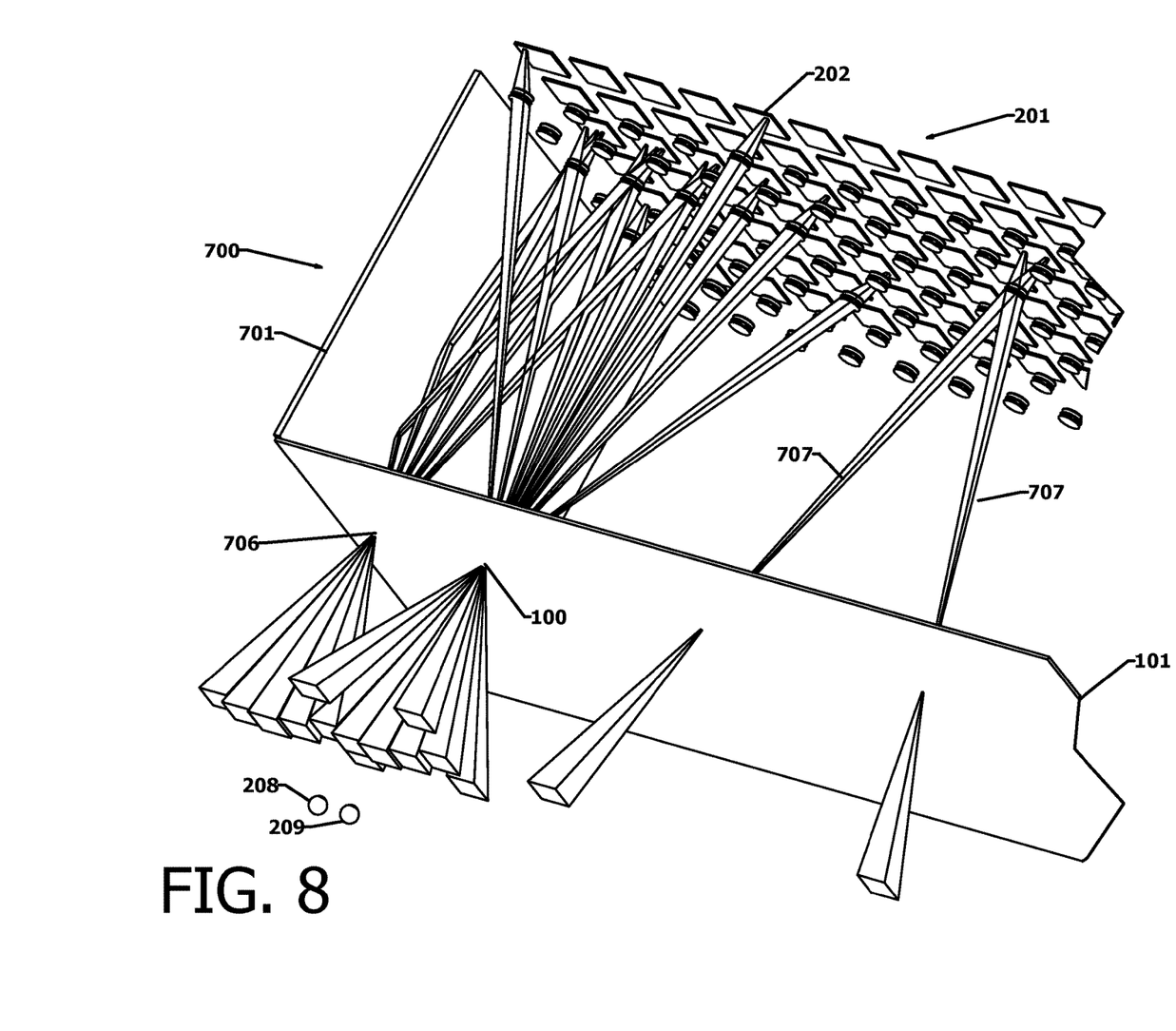
FIG. 8 is a perspective view illustrating an embodiment of the invention shown in FIG. 7.

FIG. 7 and FIG. 8 illustrate a display system 700 comprising an array 202 of a number of small projectors 201 focused on a single transparent screen 101 according to this invention, wherein each projector 201 illuminates only a portion of the area of screen 101 creating the total image as a mosaic. Light beams 707 from projector 708 indicate the illumination limits of a single projector forming the total image extent. Display system 700 may also include one or more mirrors 701 forming a reflective boundary surrounding the projector array 202. The mirrors 701 are perpendicular to the plane of the array 202 and positioned a distance approximately half the spacing between the projectors 201 from the centerline of an outer row of projectors. The mirrors 701 allow projectors near the array edge, 702 and 703 in this example, to form light beams 704 and 705 to illuminate a hogel 706 near the screen edge from angles that would otherwise require a larger projector array 202 with projectors 201 extending outside the edge of the transparent screen 101. Typically four mirrors 701 would surround the projector array 201 such that both horizontal and vertical reflections are utilized. It should be noted that pixel content in projectors such as 702 and 703 contributing to reflected light beams such as 704 and 705 must be rearranged to account for the mirror image reversal of the beams forming hogels 706.

Compared to prior art configurations in which each projector illuminates the entire screen, the mosaic approach of FIG. 7 and FIG. 8 has significant advantages. In particular, the depth dimension and physical volume of the mosaic display system is reduced compared to a conventional approach with the same image size, resolution, and brightness using an array with a smaller number of larger, higher resolution projectors. Further, such small projectors may be more suited to low cost, high volume production than larger higher performance projectors. Known methods may be used to align and adjust the projectors 201 in the projector array 202 to assure that the individual images forming the overall image mosaic are aligned with each other and have similar brightness and color values. For example, one or more digital cameras may be focused on the screen 101 while test patterns are displayed by the projectors 201 to automatically measure misalignment and color and brightness differences between projectors. This data may then be used to guide automated or manual mechanical adjustments or to set image processing parameter settings to correct misalignment. The data may also be used to establish image processing parameter settings to provide uniform color and brightness. Such measurements and adjustments may be part of the display manufacturing process, and carried out periodically to maintain display performance. Use of projectors with high mechanical and optical stability as well as stable color and brightness minimizes the need for such periodic maintenance.

What is claimed is:

1. A transparent rear projection screen incorporating arrays of refractive optical elements is interposed between an X-Y array of optical image projectors and an observer viewing space, wherein each projector comprises an illuminated two dimensional image and a projection lens focused on the rear face of the projection screen and projecting still images or moving images such that a given point of the screen is illuminated by multiple converging light ray beams from at least a subset of the projectors, the light ray beam from each projector illuminating the given point of the screen at a different incoming angle, where the screen refractive optical elements redirect the rays of the multiple light ray beams passing through each screen point into the observer viewing space such that the beams are non-diffusively expanded and, optionally, changed in direction, with the result that any given point of the screen forms a hogel emitting multiple outgoing light ray beams, wherein each outgoing light ray beam is at a different outgoing angle and originates at a different projector, thereby allowing the color and intensity of each outgoing light ray beam to be controlled independently, and, by extension, allowing an array of hogels to be formed on the projection screen and controlled to display images that may vary as a function of the observer's eye position, the refractive optical elements comprising a first array of parallel linear features formed on the rear face of the transparent screen and a second array of parallel linear features formed on the front face of the transparent screen, the array directions being substantially orthogonal, the parallel linear screen features comprising negative focal length cylindrical lens surfaces providing a non-diffusive beam expanding function, optionally the parallel linear screen features comprising prisms having negative focal length cylindrical lens surfaces formed on the light-transmitting prism faces providing a non-diffusive beam expanding function and a change in beam direction, wherein the prism function of the parallel linear features forming an array may vary systematically with position within the array such that each prism changes the beam direction by a different amount, wherein the beam direction changing parameter of each prism is adjusted such that in aggregate the prisms emulate a cylindrical Fresnel lens, the refractive optical elements of the screen are adjusted to expand adjacent projector light ray beams forming each hogel such that dark zones between the beams in the observer viewing space are minimized, wherein the spacing of the projectors in the projector array and the focal length between the projectors and the screen are adjusted such the distance between the centers of adjacent light ray beams from each hogel in the observer viewing space is less than the interocular spacing of the observer at a desired viewing distance, and optionally comprising at least one planar mirror outside the edge of the projector array, oriented substantially perpendicular to the screen and parallel to the projector array edge, and spaced at approximately half the projector spacing distance from the centerline of the adjacent row of projectors, such that light ray beams from the rows of projectors near the array edge that would otherwise miss the screen are reflected back towards the screen and contribute to hogels near the screen edge.

2. The hogel array of claim 1 wherein the extent of the screen and the extent of the X-Y projector array is greater than the extent of the field of any one projector comprising the projector array.

3. The hogel array of claim 2 wherein the projectors comprising the X-Y projector array individually have low resolution and brightness, but each covers a small screen area such that in aggregate the projector array provides a mosaic image with high resolution and brightness.

4. The hogel array of claim 1 wherein the converging output beams of the projectors are substantially square in cross-section.

5. The hogel array of claim 4 wherein the square shape of the converging projector output beams is formed by square apertures in the projector lens aperture stops, said apertures controlling the size and shape of the bundle of light rays passing through the projector lenses by selectively blocking a portion of the light ray bundles.

* * * * *